(12) United States Patent
Kim

(10) Patent No.: US 10,346,713 B2
(45) Date of Patent: Jul. 9, 2019

(54) OCR-BASED SYSTEM AND METHOD FOR RECOGNIZING MAP IMAGE, RECORDING MEDIUM AND FILE DISTRIBUTION SYSTEM

(71) Applicant: NAVER CORPORATION, Seongnam-si (KR)

(72) Inventor: Sang Kyong Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 24 days.

(21) Appl. No.: 15/394,525

(22) Filed: Dec. 29, 2016

(65) Prior Publication Data
US 2017/0109602 A1    Apr. 20, 2017

Related U.S. Application Data

(63) Continuation of application No. PCT/KR2015/006761, filed on Jul. 1, 2015.

(30) Foreign Application Priority Data

Jul. 1, 2014 (KR) .................. 10-2014-0081619

(51) Int. Cl.
*G06K 9/46* (2006.01)
*G06K 9/00* (2006.01)
*G06K 9/32* (2006.01)

(52) U.S. Cl.
CPC ....... *G06K 9/4671* (2013.01); *G06K 9/00476* (2013.01); *G06K 9/325* (2013.01); *G06K 9/4604* (2013.01); *G06K 2209/01* (2013.01); *G06K 2209/03* (2013.01)

(58) Field of Classification Search
None
See application file for complete search history.

(56) References Cited

U.S. PATENT DOCUMENTS

| 6,473,524 B1* | 10/2002 | Reda ................... G06K 9/344 382/178 |
| 8,611,592 B2* | 12/2013 | Wallace ............ G06K 9/00704 382/103 |
| 2004/0196256 A1* | 10/2004 | Wobbrock ............. G04G 21/08 345/156 |

(Continued)

FOREIGN PATENT DOCUMENTS

| JP | 2002-228477 | 8/2002 |
| KR | 10-2009-0028789 | 3/2009 |
| KR | 10-2013-0052970 | 5/2013 |

OTHER PUBLICATIONS

Int'l. Search Report issued in Int'l. App. No. PCT/KR0215/006761, dated Oct. 6, 2015.

*Primary Examiner* — Randolph I Chu
(74) *Attorney, Agent, or Firm* — Greer, Burns & Crain, Ltd.

(57) ABSTRACT

Disclosed are OCR-based system and method for recognizing a map image. The system for map recognition comprise a recognition unit for recognizing text on an inputted image by means of a text recognition technology; a search unit for searching, in a database comprising toponym data, for a toponym corresponding to the text; and a provision unit for providing map information comprising the toponym as a result of the recognition of the inputted image.

13 Claims, 19 Drawing Sheets

(56) References Cited

U.S. PATENT DOCUMENTS

2011/0013014 A1* 1/2011 Wassingsbo ....... G01C 21/3614
  348/113
2017/0328730 A1* 11/2017 Amacker ........... G01C 21/3602

* cited by examiner

OCR-BASED SYSTEM AND METHOD FOR RECOGNIZING MAP IMAGE, RECORDING MEDIUM AND FILE DISTRIBUTION SYSTEM

CROSS-REFERENCE TO RELATED APPLICATION

This application is a continuation of International Patent Application No. PCT/KR2015/006761 filed on Jul. 1, 2015, claiming priority based on Korean Patent Applications No. 10-2014-0081619 filed on Jul. 1, 2014, the contents of all of which are incorporated herein by reference in their entirety.

BACKGROUND OF THE INVENTION

One or more example embodiments of the present invention relate to technology for recognizing a map image and searching for a map area corresponding to the recognized image.

A map recognition method enables a person to directly view a map image and recognize an area corresponding to the map image. However, the person needs to manually retrieve and recognize the area corresponding to the map image and thus, may experience some inconveniences.

Also, a map recognition method based on a map topology may extract topographical information from an input map image in a state in which a database about topographical information of a map is constructed in advance and then may retrieve a map area including the extracted topographical information by referring to the database.

For example, Korean Patent Publication No. 10-2013-0052970, published on May 23, 2013, titled "apparatus and method for providing a map service using image matching technology", discloses technology for receiving a map image, extracting a feature point from the map image, and providing map information about a final image matched to the map image based on the extracted feature point.

However, the existing map recognition method may not readily construct a database about a map image, and may not recognize a map in response to an input of another map image aside from the constructed map image.

BRIEF SUMMARY OF THE INVENTION

Example embodiments provide a system and method that recognizes a map image without being affected by a type or a form of a map.

Example embodiments also provide a system and method that recognizes a point of interest (POI) on a map image using an optical character reader (OCR) technology.

Example embodiments also provide a system and method that provides a recognition result of a map image based on a POI.

According to an aspect of at least one example embodiment, there is provided a map recognition system including a recognizer configured to recognize a character on an input image using a character recognition technology; a searcher configured to search a database including point of interest (POI) information for a POI corresponding to the character; and a provider configured to provide map information including the POI as a recognition result of the input image.

According to an aspect of at least one example embodiment, there is provided a map recognition method configured as a computer, the method including recognizing a character on an input image using a character recognition technology; searching a database including POI information for a POI corresponding to the character; and providing map information including the POI as a recognition result of the input image.

According to an aspect of at least one example embodiment, there is provided a file distribution system for distributing a file of an application installed on a user terminal, the file distribution system including a file transmitter configured to transmit the file in response to a request from the user terminal. The application includes: a module configured to recognize a character on an input image using a character recognition technology; a module configured to search a database including POI information for a POI corresponding to the character; and a module configured to provide map information including the POI as a recognition result of the input image.

According to some example embodiments, it is possible to recognize any type of map images, such as a paper map, a rough or sketch map (i.e., a map drawn from observation rather than from exact measurement), etc., as well as a precise electronic map, without being affected by a type or a form, by recognizing a point of interest (POI) on a map image using an optical character reader (OCR) technology and by retrieving a map area corresponding to the map image based on the recognized POI.

According to some example embodiments, it is possible to recognize a map image based on a POI and to accurately retrieve a map area corresponding to the map image using a database including POI information, instead of using a database about the entire topographical information of the map image.

DETAILED DESCRIPTION OF THE INVENTION

Hereinafter, example embodiments will be described with reference to the accompanying drawings.

The example embodiments relate to technology for receiving a map image and retrieving an actual map area corresponding to the received image, and may be applicable to various map service fields, such as a map search service, a location verification service, a find-a-way/road guide service, etc.

Figure 1:
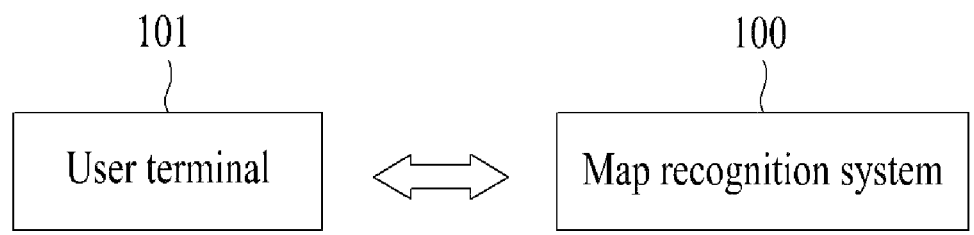
FIG. 1 is a diagram illustrating a relationship between a user terminal and a map recognition system according to an example embodiment.

FIG. 1 illustrates a relationship between a user terminal 100 and a map recognition system 101 according to an example embodiment. In FIG. 1, an indicator with arrowheads may indicate that data may be transmitted and received between the map recognition system 100 and the user terminal 101 over a wired/wireless network.

The user terminal 101 may refer to a personal computer (PC), a smartphone, a tablet, a wearable computer, and the like, and may refer to any type of terminal devices capable of connecting to a website/mobile site associated with the map recognition system 100, or installing and executing a service exclusive application, for example, a map recognition app. Here, the user terminal 101 may perform the overall service operation, such as service screen configuration, data input, data transmission and reception, data storage, and the like, under control of the website/mobile site or the exclusive application.

The map recognition system 100 serves as a service platform that provides a map service to a client, that is, the user terminal 101. In particular, the map recognition system 100 provides a platform service that receives a map image from the user terminal 101, recognizes point of interest (POI) information on the map image using optical character reader (OCR) technology, and retrieves an actual map area, for example, a latitude/longitude and a boundary, corresponding to the map image based on the recognized POI. Here, the map recognition system 100 may be configured in an application form on the user terminal 101, and without being limited thereto, may be configured to be included in a service platform that provides a map recognition service in a client-server environment.

Figure 2:
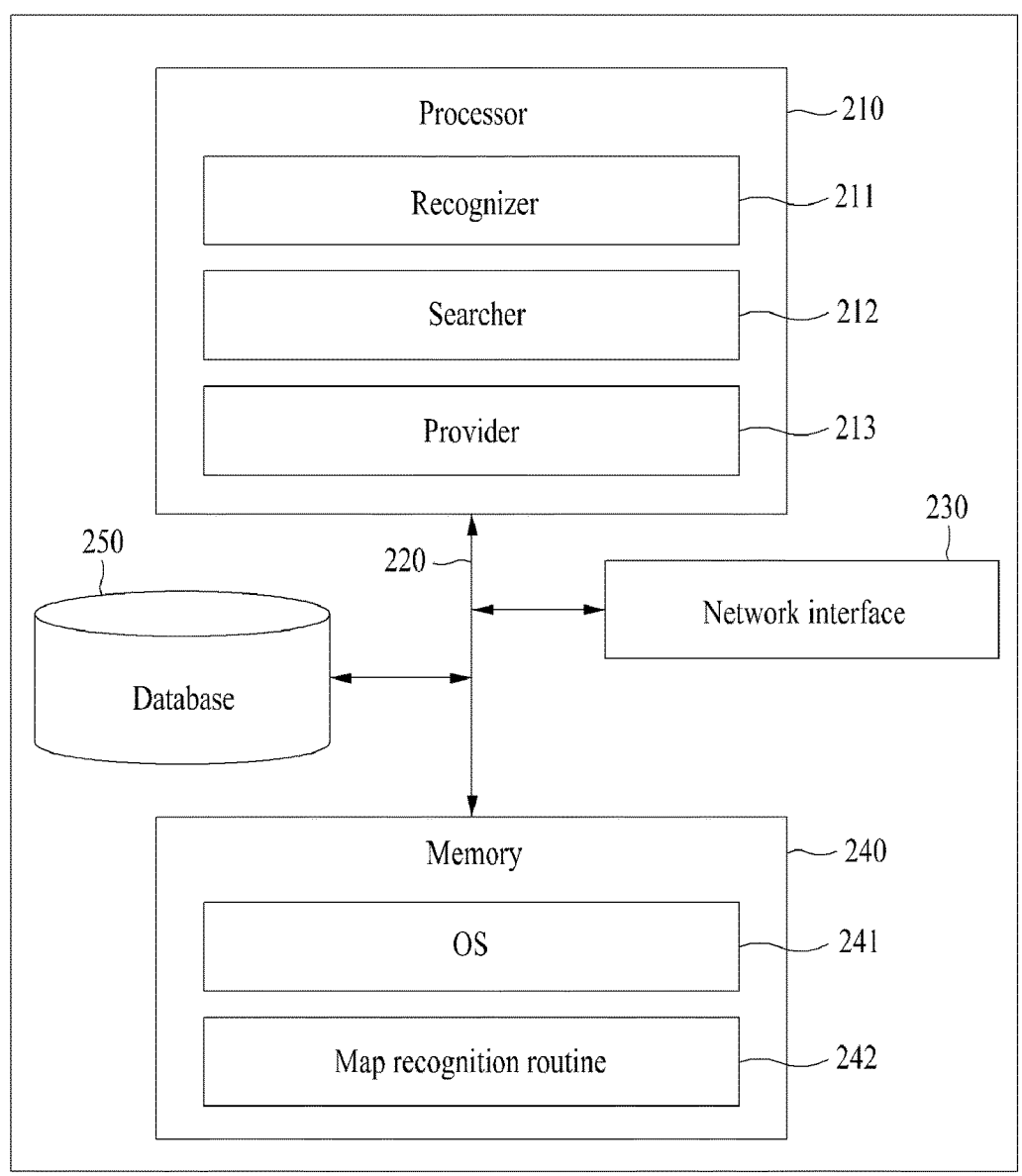
FIG. 2 is a block diagram illustrating a configuration of a map recognition system according to an example embodiment.
Figure 3:
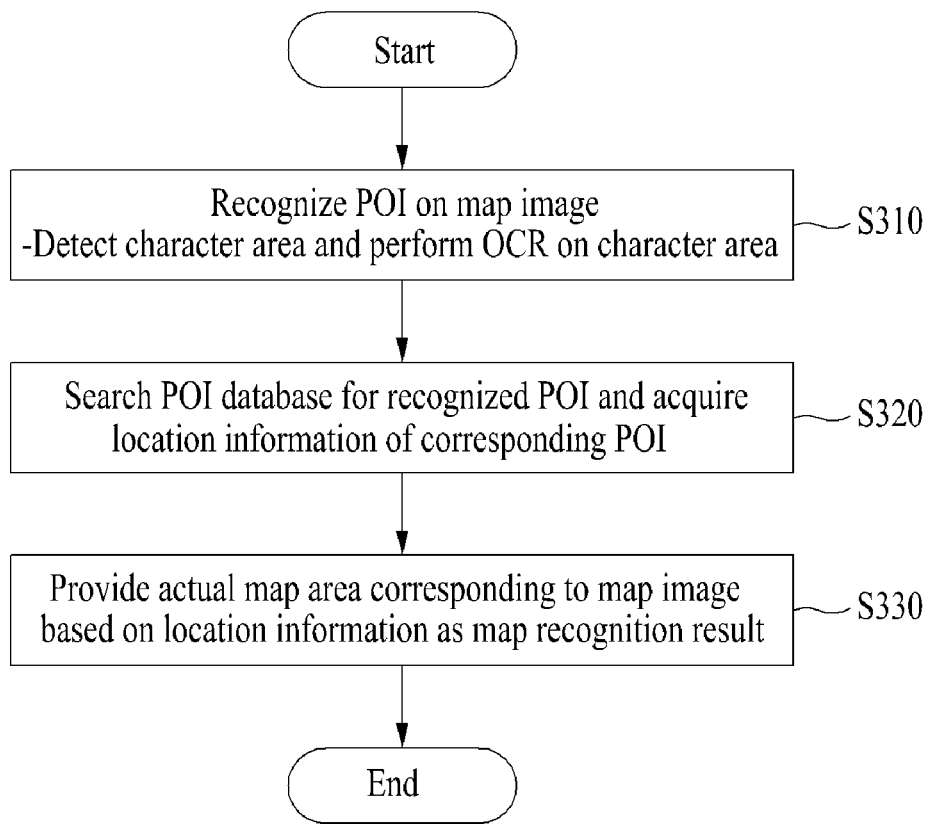
FIG. 3 is a flowchart illustrating a map recognition method according to an example embodiment.

FIG. 2 is a block diagram illustrating a configuration of the map recognition system 100 according to an example embodiment, and FIG. 3 is a flowchart illustrating a map recognition method according to an example embodiment.

Referring to FIG. 2, a map recognition system 100 includes a processor 210, a bus 220, a network interface 230, a memory 240, and a database 250. The memory 240 may include an operating system (OS) 241 and a map recognition routine 242. The processor 210 may include a recognizer 211, a searcher 212, and a provider 213. According to other example embodiments, the map recognition system 100 may include a greater or lesser number of constituent elements shown in FIG. 2.

The memory 240 may include a permanent mass storage device, such as a random access memory (RAM), a read only memory (ROM), and a disc drive, as a computer-readable storage medium. Also, program codes for the OS 241 and the map recognition routine 242 may be stored in the memory 240. Such software constituent elements may be loaded from another computer-readable storage medium separate from the memory 240 using a drive mechanism (not shown). The other computer-readable storage medium may include, for example, a floppy drive, a disc, a tape, a DVD/CD-ROM drive, a memory card, etc. According to other example embodiments, software constituent elements may be loaded to the memory 240 through the network interface 230 instead of the computer-readable storage medium.

The bus 220 enables communication and data transmission between the constituent elements of the map recognition system 100. The bus 220 may be configured using a high-speed serial bus, a parallel bus, a storage area network (SAN), and/or another appropriate communication technology.

The network interface 230 may be a computer hardware constituent element for connecting the map recognition system 100 to the computer network. The network interface 230 may connect the map recognition system 100 to the computer network through a wireless or wired connection.

The database 250 may include a POI database that stores and maintains information required for map recognition, particularly, POI information. For example, POI information refers to information about a POI on a map and latitude and longitude that are POI-by-POI location information may be matched and configured in the POI database. Table 1 shows an example of the POI database. FIG. 2 illustrates that the database 250 is included in the map recognition system 100. The database 250 may be present as an external database constructed on a separate system.

TABLE 1

| POI | Latitude | Longitude |
| --- | --- | --- |
| Gangnam-gu Office | 37.517319 | 127.047498 |
| Gangnam Station | 37.497984 | 127.027639 |
| Hospital Mary Doty | 37.598214 | 126.928786 |
| Myeongji College | 37.584667 | 126.925398 |
| Sangsu Station | 37.547765 | 126.922976 |
| Sogang University | 37.551727 | 126.941062 |
| Sejong City Hall | 36.592924 | 127.292382 |
| Electronic Office | 37.580984 | 126.888393 |

The processor 210 may be configured to process computer-readable instructions of a computer program by performing basic arithmetic operations, logic operations, and input/output operations of the map recognition system 100. The computer-readable instructions may be provided from the memory 240 or the network interface 230 to the processor 210 through the bus 220. The processor 210 may be configured to execute program codes for the recognizer 211, the searcher 212, and the provider 213, which are functional units of the processor 210 for performing predefined operations. The program codes may be stored in a storage device, such as the memory 240.

The recognizer 211, the searcher 212, and the provider 213 may be configured to perform operations S310 through S330 of FIG. 3.

In operation S310, the recognizer 211 receives a map image from the user terminal 101 as an input image and recognizes a POI on the received map image. The user terminal 101 may acquire a map that is imaged using a variety of schemes, such as camera photographing, screen capturing of a rough map, and the like, and may input the acquired map to the map recognition system 100 as an input image. That is, the user terminal 101 may use an image of any type of maps as an input image for map recognition, regardless of a form or a type, for example, a rough or sketch map, a paper map such as a tour map, a map that is imaged through camera or screen capturing, and the like, as well as an electronic map (e-map). Accordingly, the recognizer 211 extracts a character area from the map image and recognizes a character on the map image by performing an OCR on the extracted character area.

In operation S320, the searcher 212 searches the POI database for a location on an actual map in association with the POI recognized in operation S310 and acquires the location. That is, the searcher 212 searches the POI database storing location information for each POI for the POI recognized on the map image through the OCR.

In operation S330, the provider 213 provides an actual map area corresponding to the map image as a map recognition result based on location information of each POI acquired by searching the POI database in operation S320. That is, the provider 213 provides map information including the POI recognized through the OCR as a result of recognizing the map image. For example, the provider 213 may calculate a center point (latitude/longitude) and a boundary of an area corresponding to the map image by comparing a location on the map image and a location on the actual map acquired by searching the POI database in association with the POI recognized on the map image. The provider 213 may acquire a scale, for example, a level, suitable for a size of an output screen based on the calculated center point and boundary, and may display a map image recognition result.

Hereinafter, a process of recognizing a POI on a map image will be described.

Figure 4:
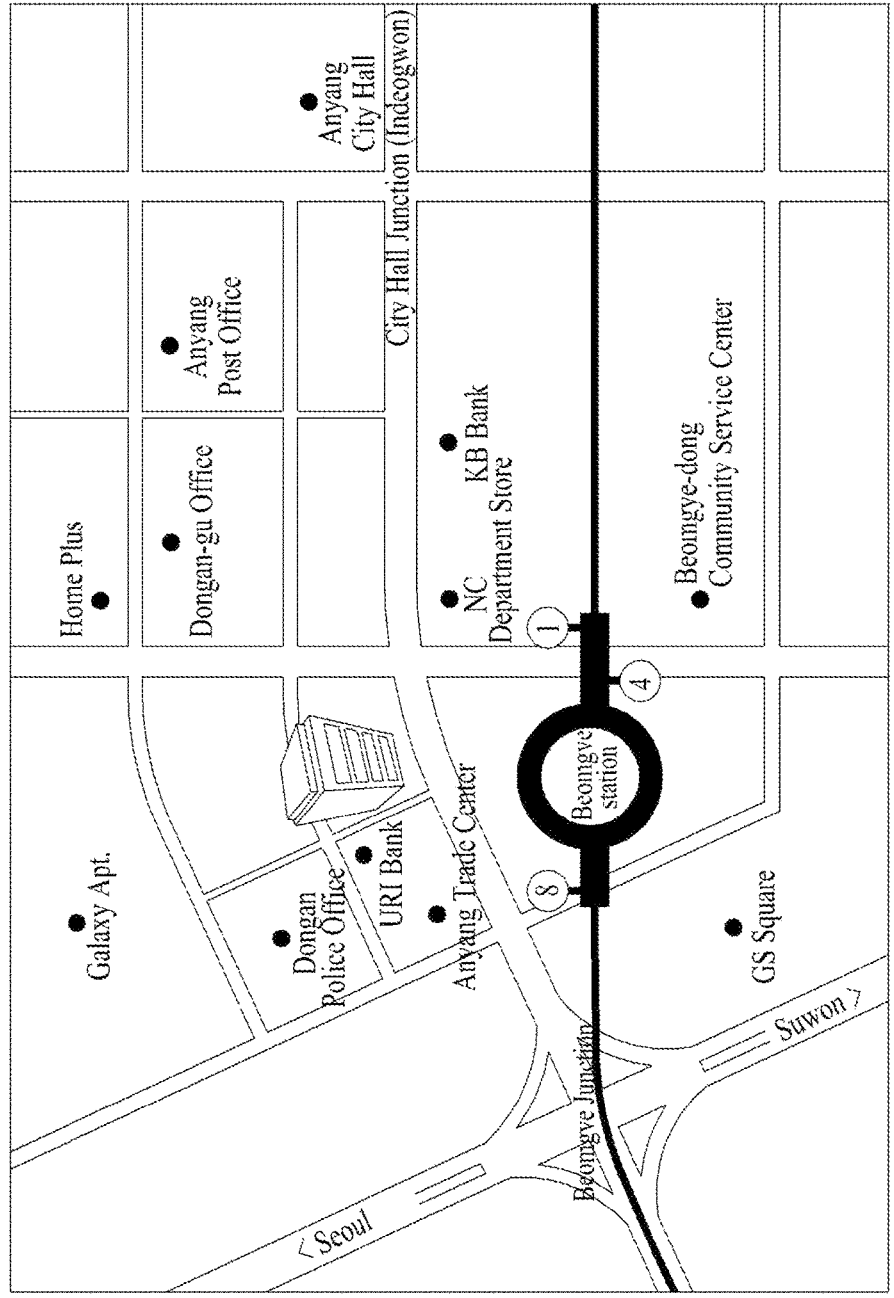
FIGS. 4 through 18 illustrate a process of recognizing a map image and providing a recognition result according to example embodiments.

Herein, it is assumed that a rough map of FIG. 4 is input as an input image.

The recognizer 211 may receive, from the user terminal 101, the map image (hereinafter, referred to as the input image) of FIG. 4 that is imaged through camera or image capturing and the like, and may extract a character area from the input image for POI recognition. A written or printed character may have many corners. Thus, if corners are densely located, the probability of the existence of a character may increase. Under this assumption, a character area may be extracted.

Figure 5:
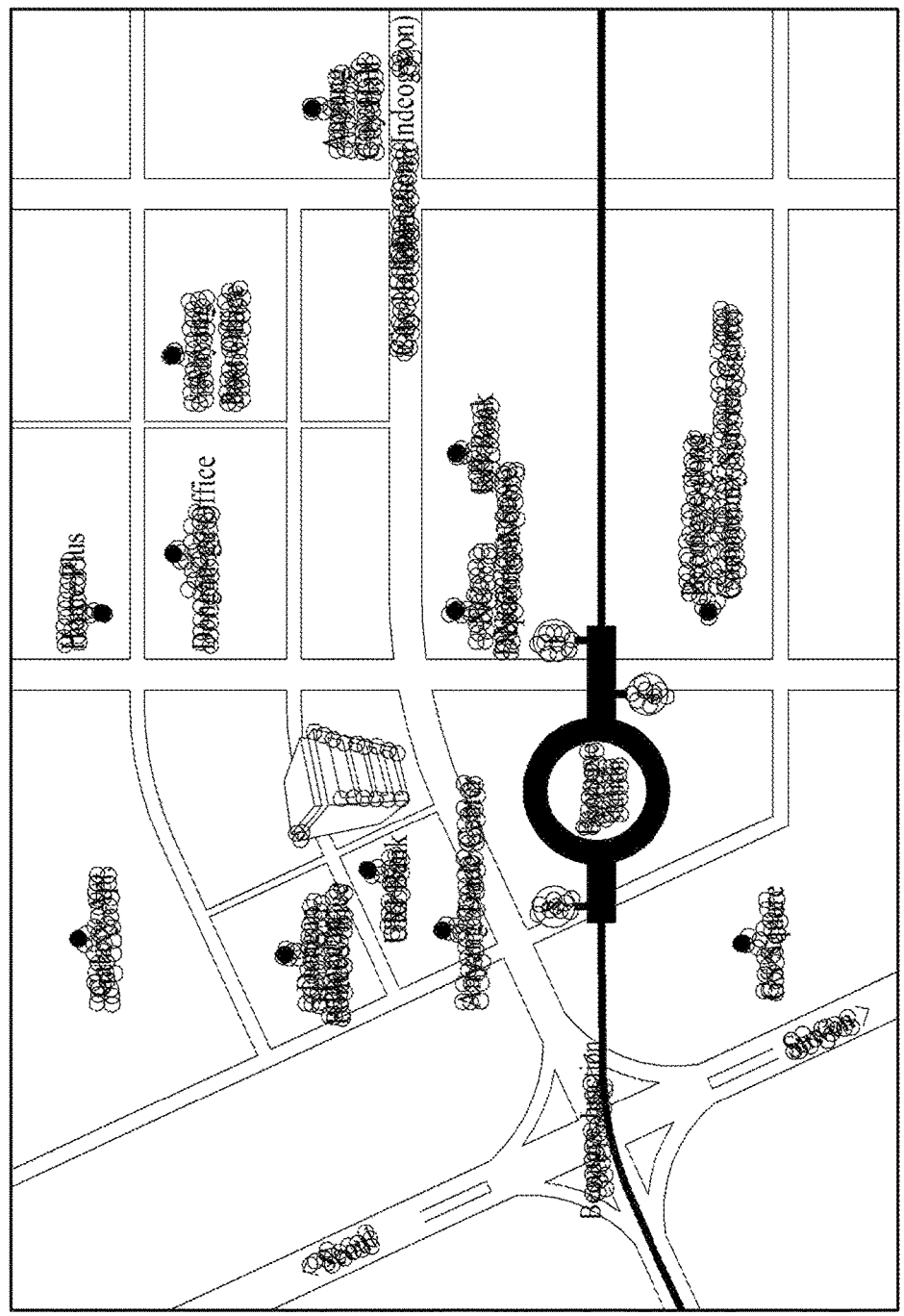
Figure 6:
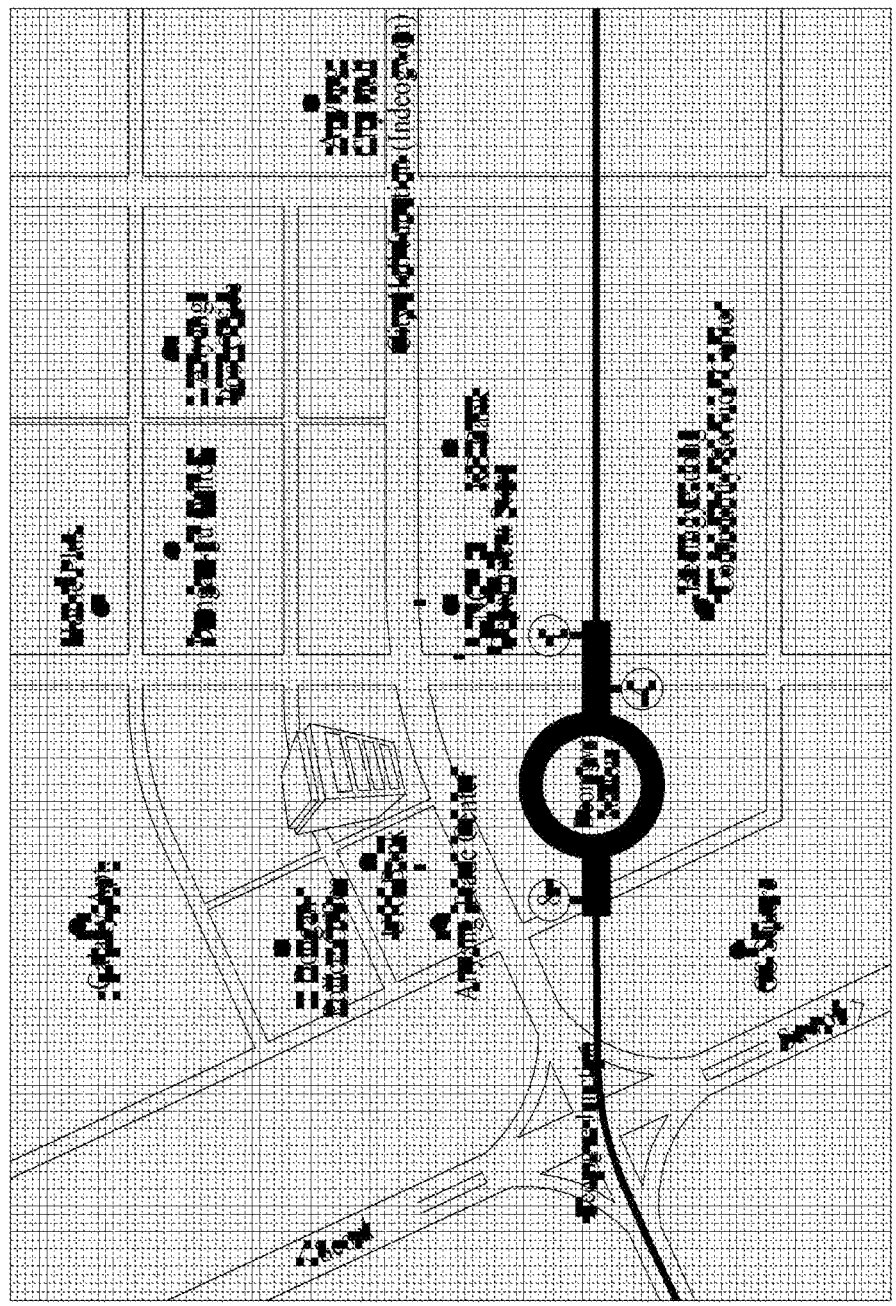
Figure 7:
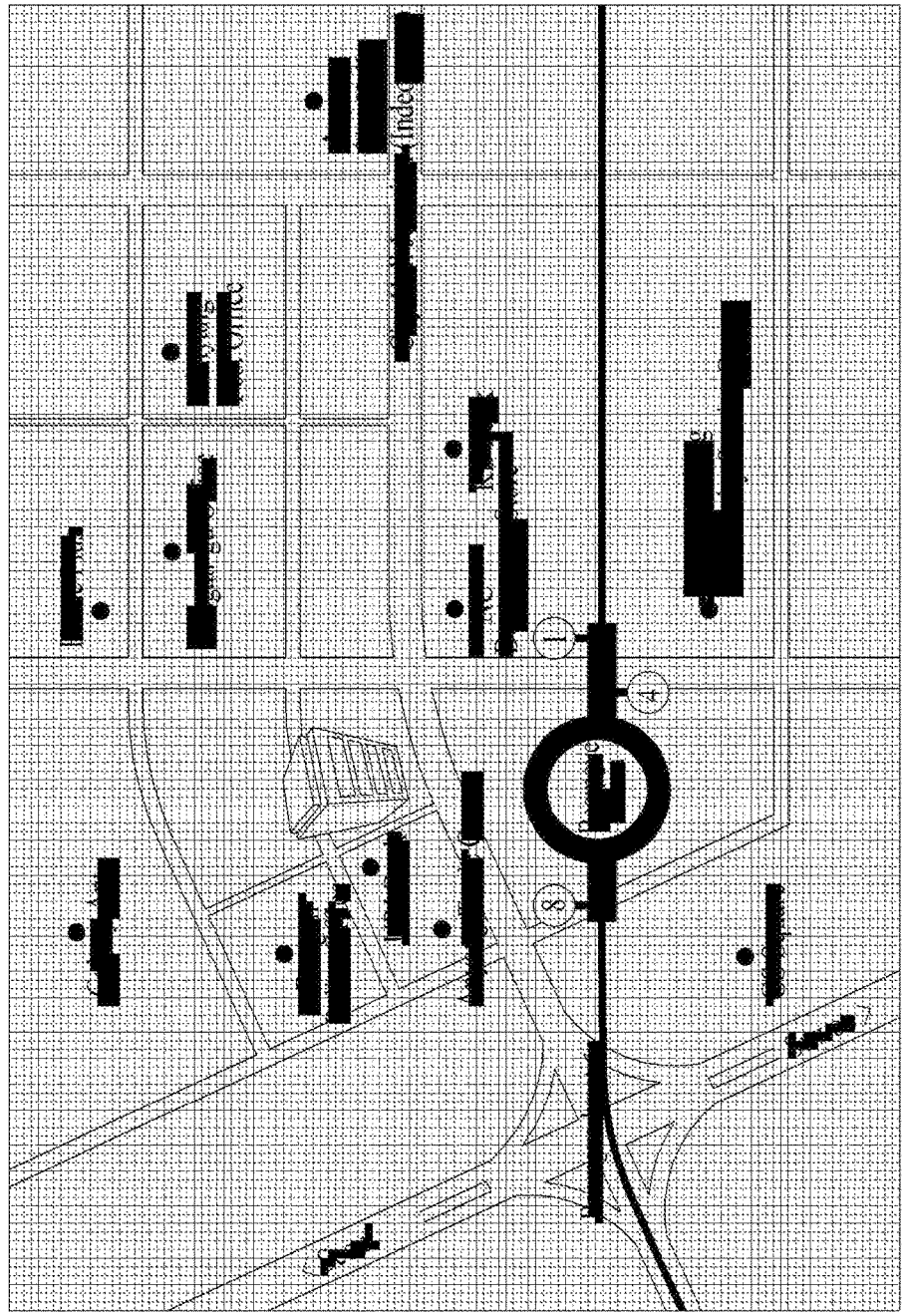
Figure 8:
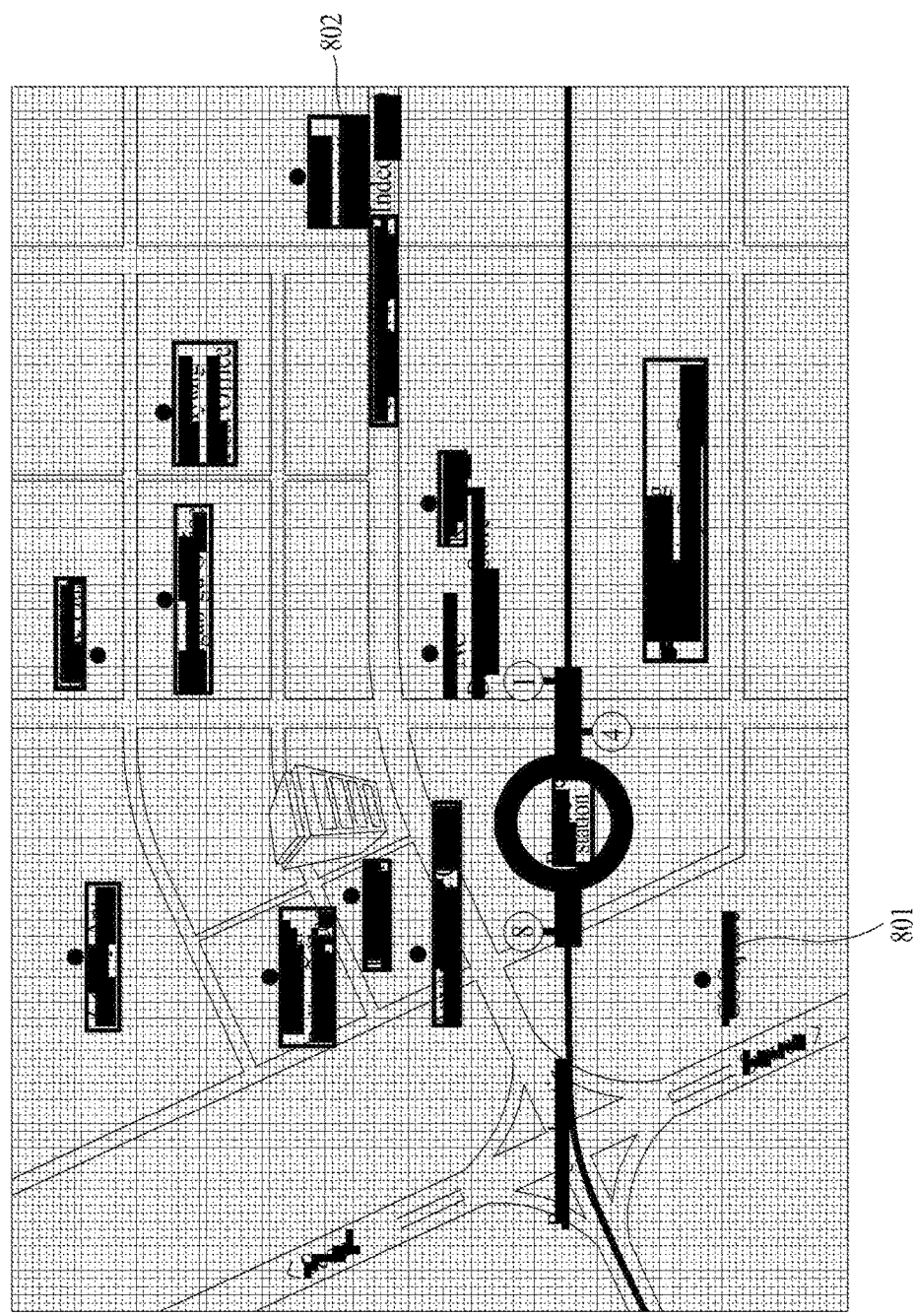
Figure 9:
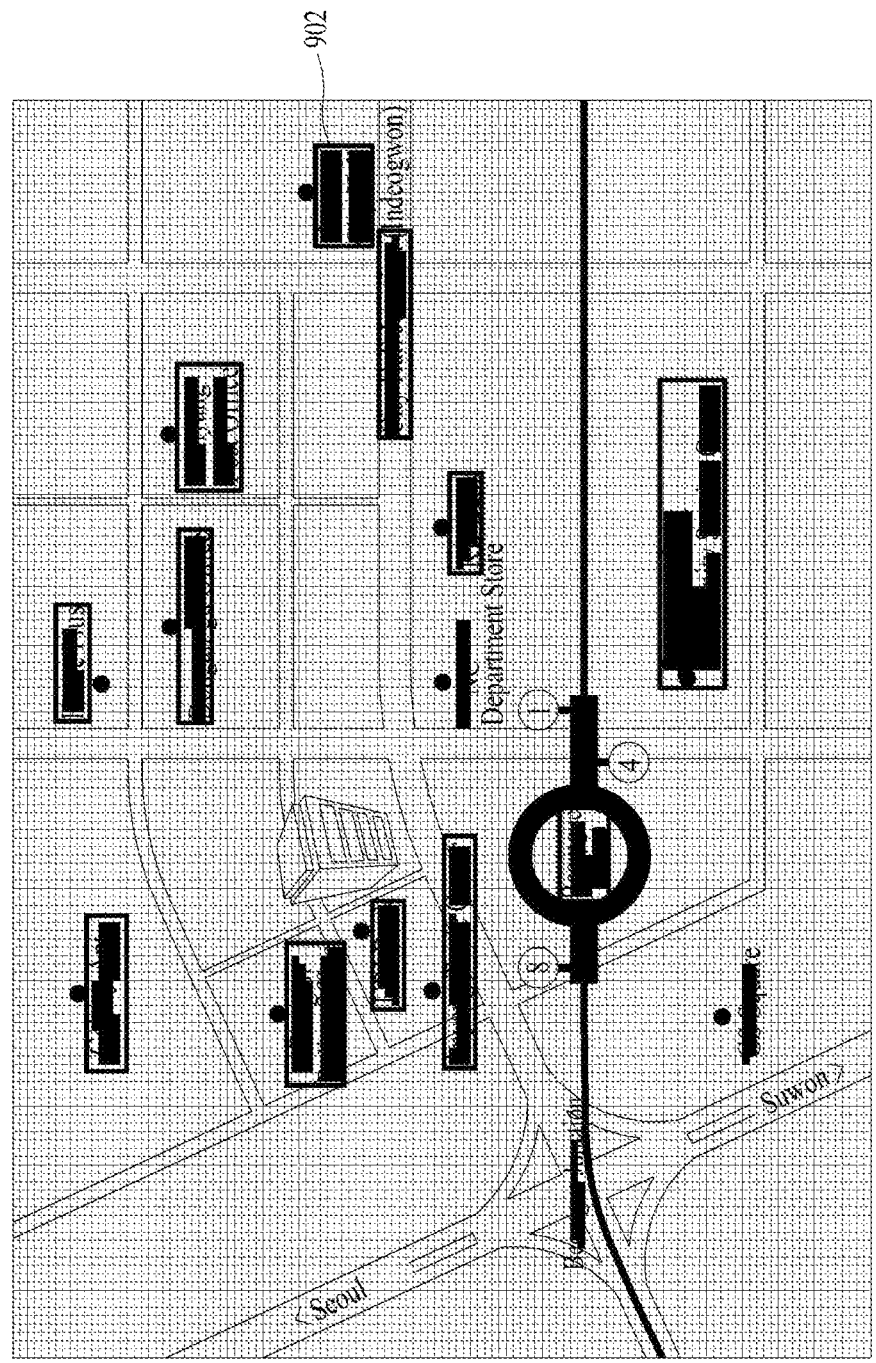
Figure 10:
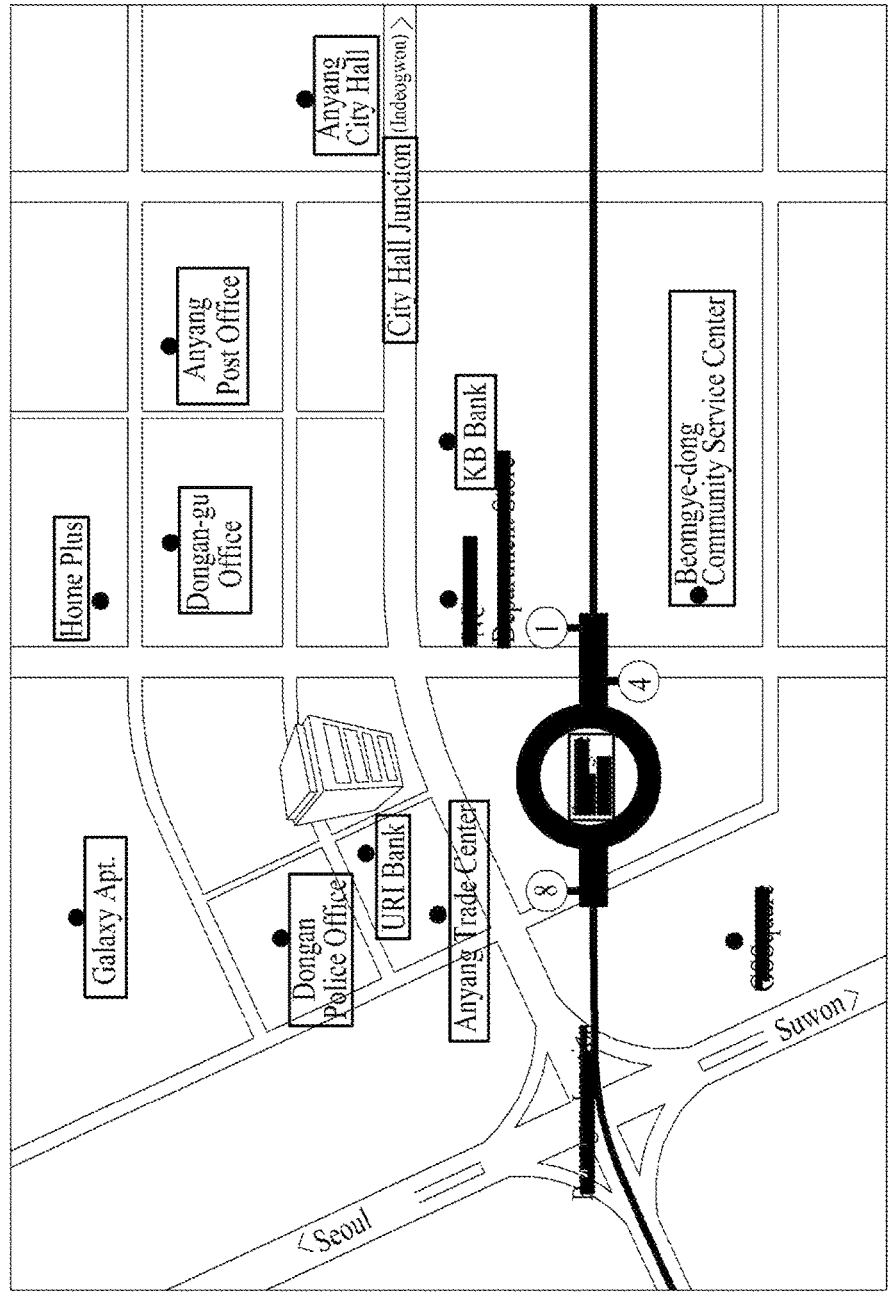

For example, the recognizer 211 may detect corners from the input image using a corner detector, such as a Harris corner detector. FIG. 5 illustrates a result of detecting corners from an input image using a Harris corner detector. The recognizer 211 may create a binary corner grid map in a grid shape and may process marking on an area, for example, a cell that includes corners on the binary corner grid map. FIG. 6 illustrates a result of marking a grid cell that includes corners on a binary corner grid map. The recognizer 211 may perform noise removal and area expansion on a marked character area on the binary corner grid map using binary image morphology. FIG. 7 illustrates a result of performing noise removal and area expansion on the marked image of FIG. 6. Referring to FIG. 8, the recognizer 211 may detect a contour on the binary corner grid map and may perform clustering processing of the detected contour to be a rectangular area. Here, a rectangle 801 with a size less than a minimum size may be processed or considered to be junk. That is, as shown in FIG. 8, the recognizer 211 may cluster a contour to be in a rectangular shape and may detect a rectangle 802 that satisfies the minimum size as a valid area, that is, a character area. Here, referring to FIG. 9, the recognizer 211 may vertically and horizontally expand a rectangle detected as a character area by each predetermined cell, for example, each single cell, and may determine an expanded rectangle area 902 as a final character area. The recognizer 211 may perform an OCR on the final character area and may recognize a character read from the corresponding area as a POI. Here, the accuracy of the OCR result may be enhanced by performing post-processing using a keyword correction. FIG. 10 illustrates a result of performing an OCR on a character area detected from an input image.

According to the example embodiments, since a map recognition may be performed using OCR technology, it is possible to recognize any type of maps, such as an e-map, a paper map, a rough map, etc., without being limited to a specific map.

Hereinafter, a process of calculating a center point (latitude/longitude) and a boundary of an area corresponding to a map image will be described.

Prior to providing a map recognition result, the provider 213 may calculate a center point and a boundary of an area corresponding to a map image.

Figure 11:
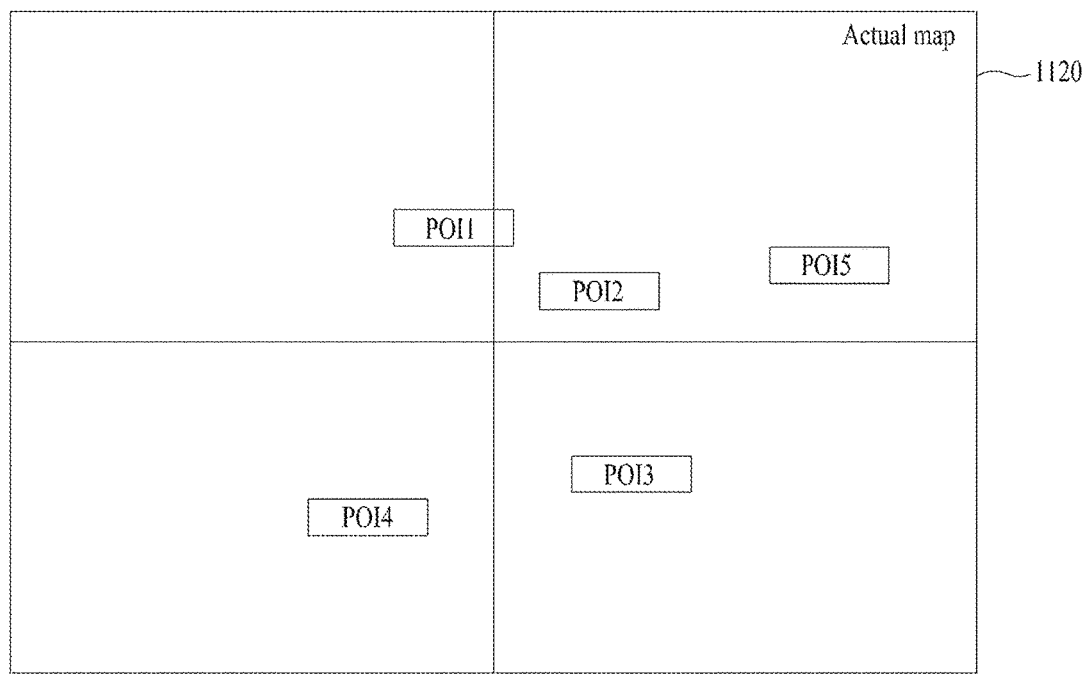

To this end, the searcher 212 may search the POI database for a POI recognized through the OCR, and may acquire a location of the POI on an actual map. FIG. 11 illustrates POI locations on an actual map 1120 acquired by searching the POI database for a POI recognized on an input image.

Figure 12:
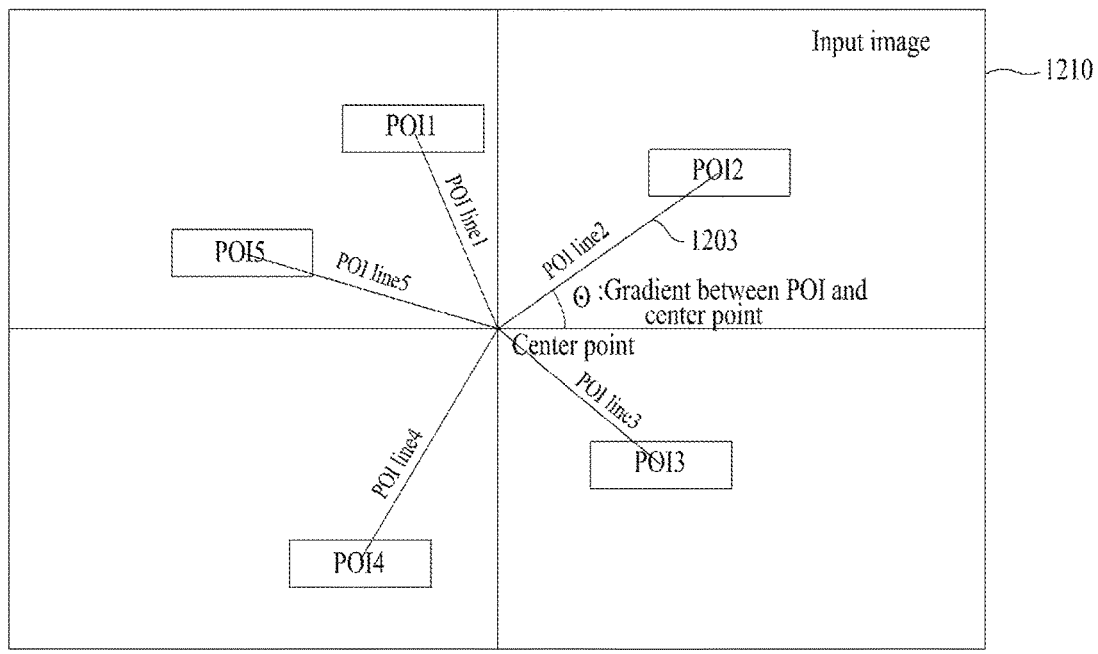
Figure 13:
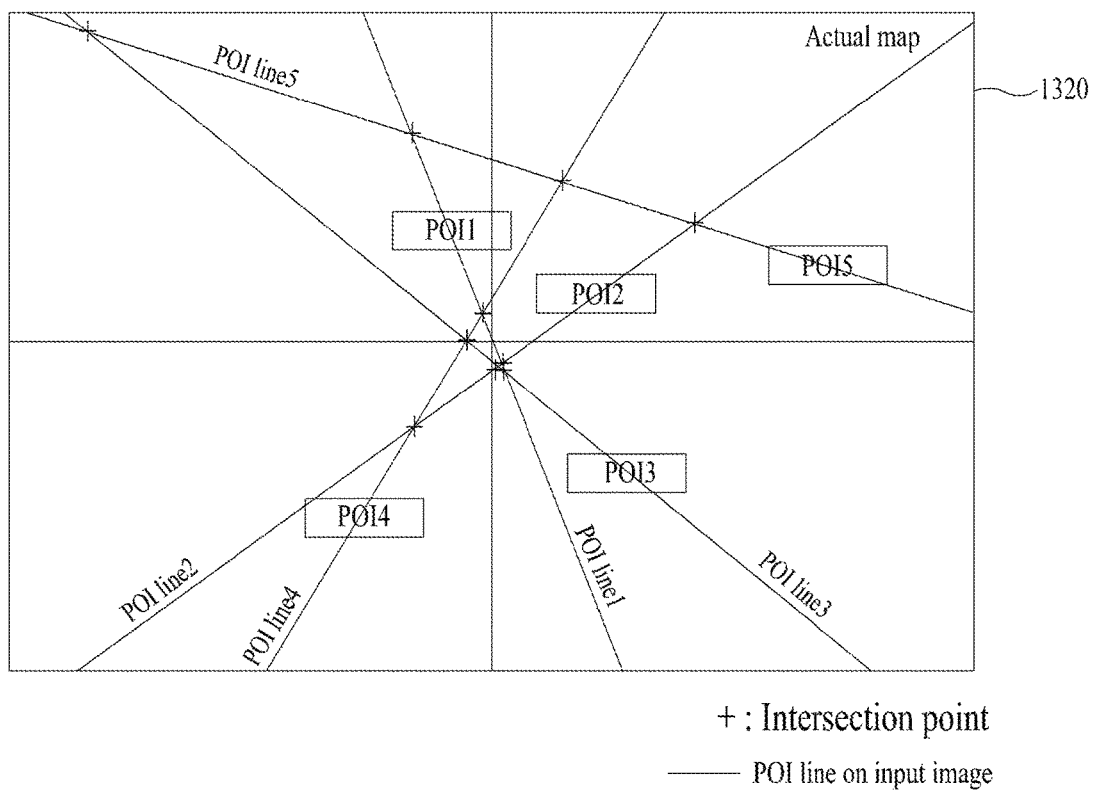
Figure 14:
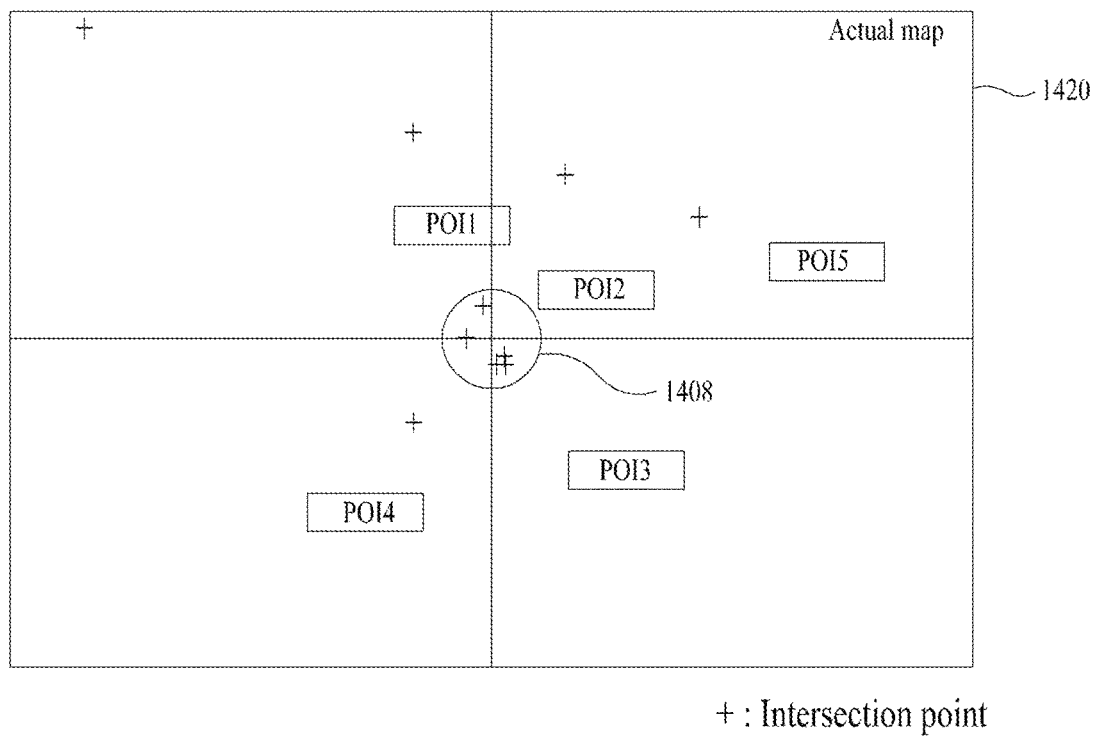

Referring to FIG. 12, the provider 213 may acquire a gradient between a center point and each POI on an input image 1210. Herein, a straight line 1203 that connects the center point of the input image 1210 and a center point of a POI is referred to as a POI line. An error may be present in a POI location on an input image and a POI location on an actual map due to image distortion and the like. Based thereon, the provider 213 may acquire an intersection point between POI lines by projecting or shifting the POI lines from the input image on an actual map area that includes POI locations retrieved by searching the POI database. That is, referring to FIG. 13, the provider 213 may map extension lines having the gradients of the POI lines (POI line1-POI line5) acquired from an input image (see FIG. 12) and projecting or shifting each of these POI lines (while maintaining the gradient) to center of the corresponding POI location acquired by searching the POI database on an actual map 1320, and may acquire an intersection point between the POI lines. If a POI location on an input image matches a POI location on an actual map, an intersection point between POI lines may match the center coordinates of the input image. However, referring to FIG. 14, even if a POI location on an input image and a POI location on an actual map do not accurately match, many intersection points may be densely present at a single area, for example, area 1408. Based on this assumption, the provider 213 may acquire center coordinates corresponding to a center of an input image on an actual map 1420. That is, in the area 1408 in which intersection points are densely distributed, an average value of intersection points within a predetermined distance may be a center point of a map. For example, the provider 213 may calculate a distance between intersection points and if the distance between the intersection points is greater than a predetermined threshold, the provider 213 may regard the corresponding intersection points as noise and calculate an average value of remaining intersection points excluding the intersection points corresponding to the noise and may determine the calculated average value as the center coordinates of the map.

Figure 15:
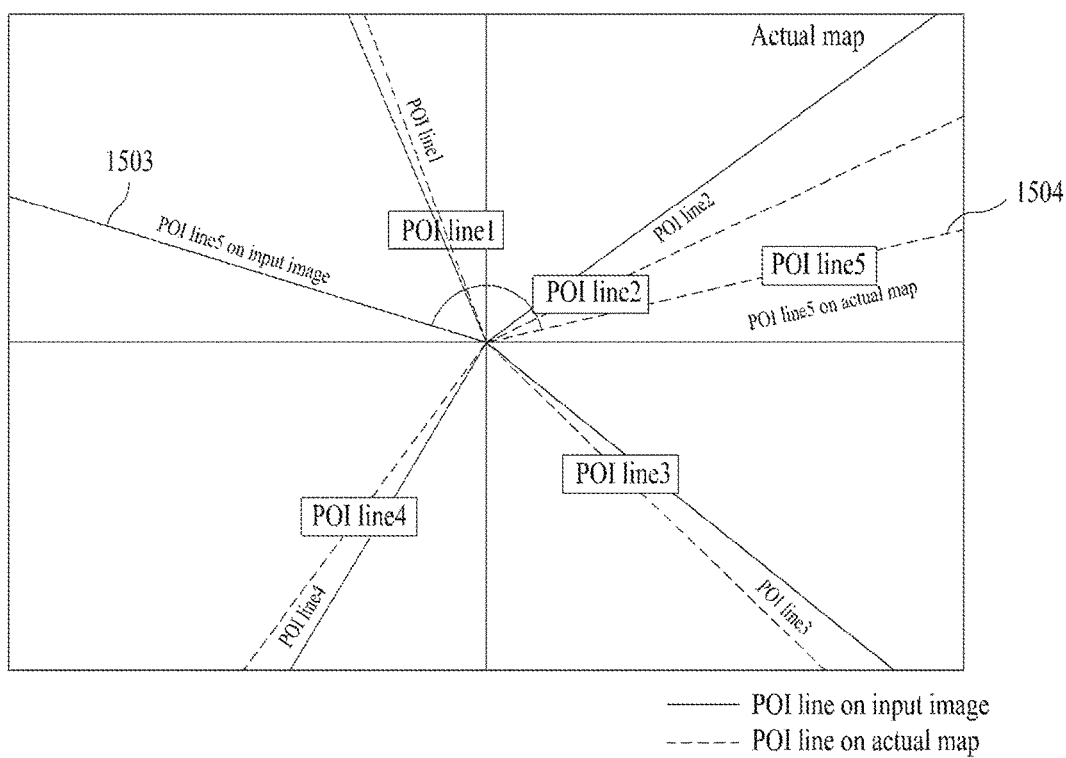

Referring to FIG. 15, the provider 213 may compare a gradient between a POI line (solid line) on an input image and a POI line (dashed line) on an actual map corresponding to their respective POIs, may regard the compared POIs of which the difference in gradient is greater than a predetermined threshold as noise, and may remove the POIs regarded as the noise. That is, in FIG. 15, comparing a POI line 1503 on the input image corresponding to the POI5 on the input image and a POI line 1504 on the actual map, corresponding to the POI5 on the actual image shows a significantly great gradient difference relative to the differences in the gradient of other POIs.

Figure 16:
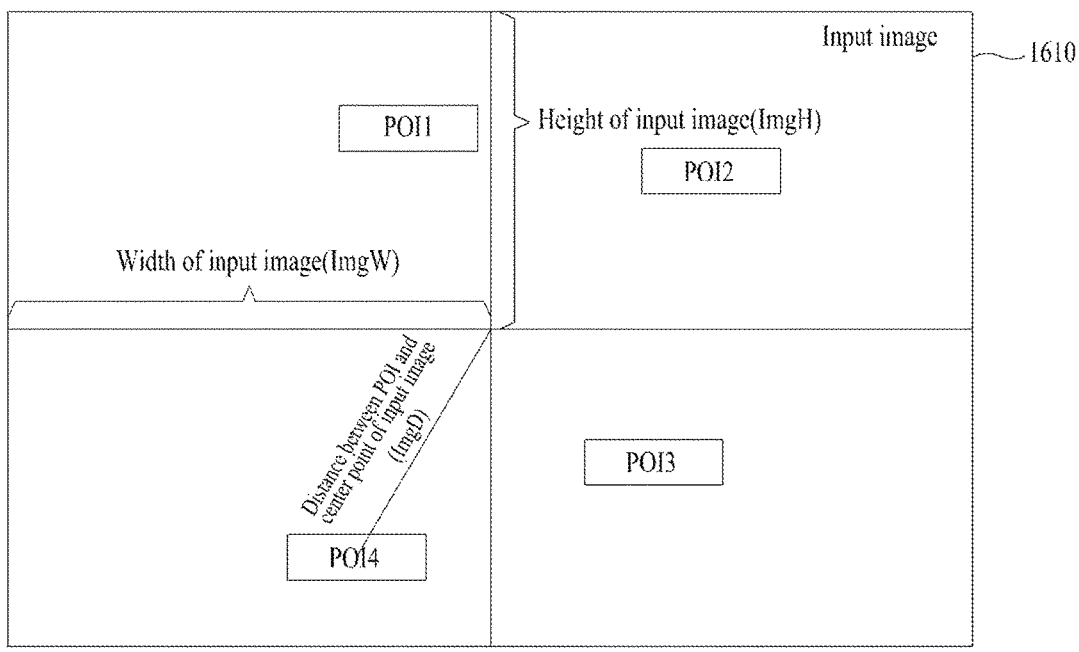
Figure 17:
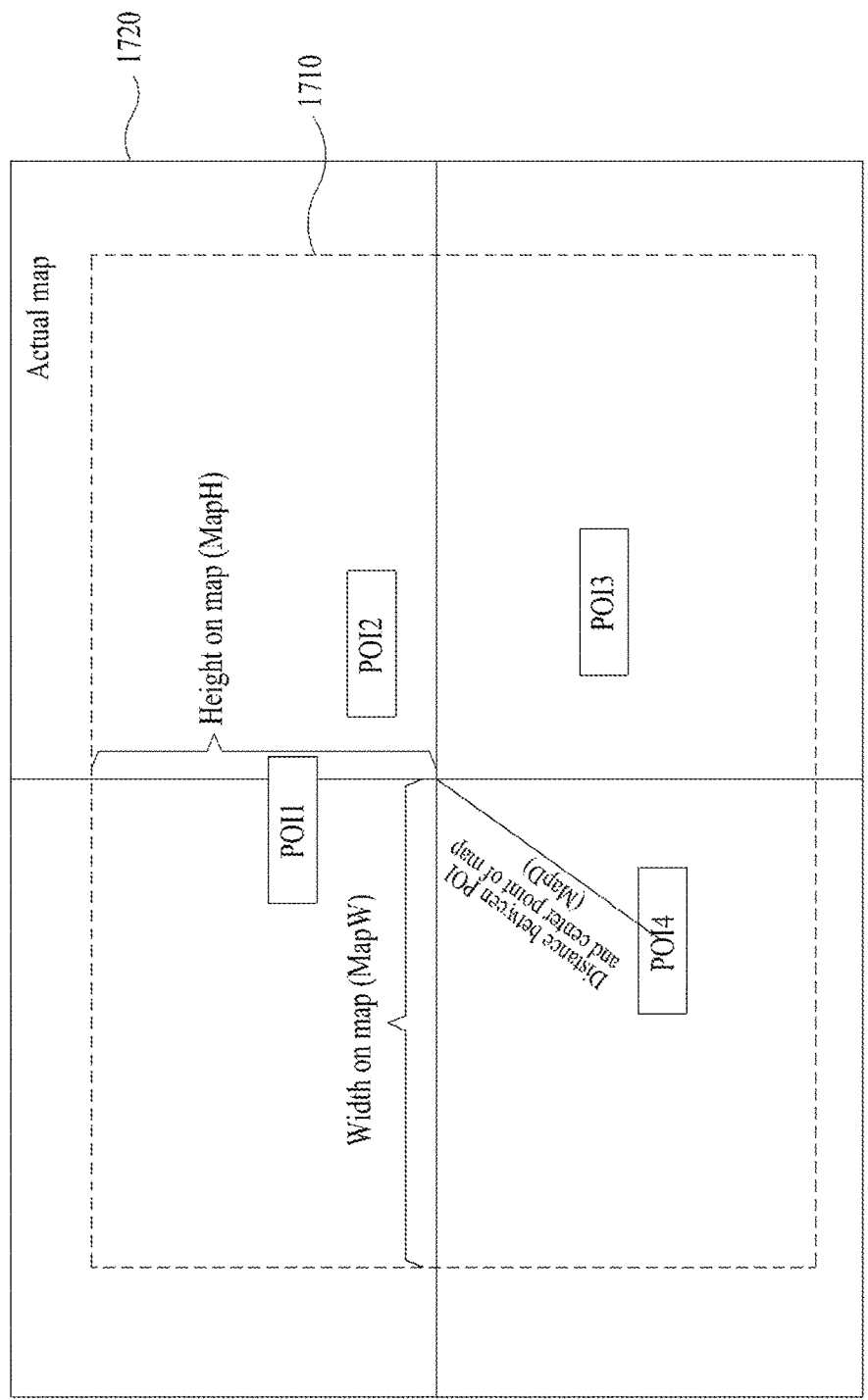

The provider 213 may acquire a boundary of an input image that is represented on an actual map based on a distance between a POI and a center point of the input image and a size of the input image. In detail, referring to FIG. 16, the provider 213 may calculate a distance ImgD between a center point of an input image 1610 and any one of the POIs (POI4 selected in FIG. 16), and a width ImgW and a height ImgH based on the center point of the input image 1610 to the respective boundary or edge of the input image. Referring to FIG. 17, the provider 213 may calculate a distance MapD between a center point of an actual map 1720 and a POI. The provider 213 may calculate a width MapW and a height MapH of an actual map corresponding to an input image based on a distance ImgD between a center point of the input image and the POI, a width ImgW and a height IMgH of the input image, and the distance MapD between the center point of the actual map and the POI.

The width MapW and the height MapH of the actual map may be defined according to a proportional expression, as expressed by Equation 1 and Equation 2.

$$ImgD : ImgW = MapD : MapW$$

$$MapW = (ImgW * MapD)/ImgD \quad \text{[Equation 1]}$$

$$ImgD : ImgH = MapD : MapH$$

$$MapH = (ImgH * MapD)/ImgD \quad \text{[Equation 2]}$$

Referring to FIG. 17, the provider 213 may calculate a width mapW and a height MapH on the actual map 1720 that is proportional to an input image 1710, and may acquire a boundary of a map area corresponding to the input image 1710.

Figure 18:
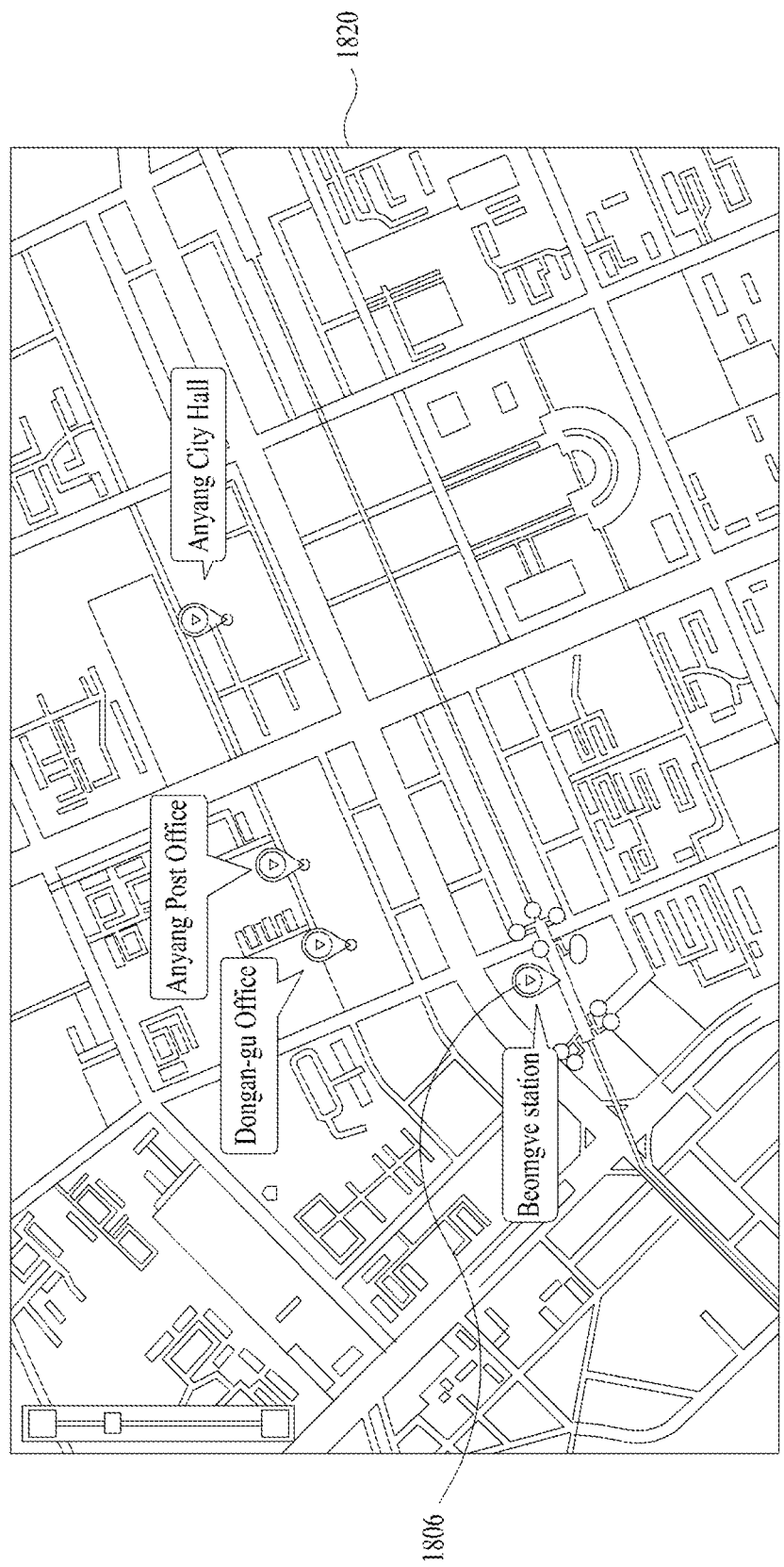

Accordingly, the provider 213 may provide a map area of a scale, for example, a level, suitable for a size of an output screen based on the map center point and the boundary calculated in association with the input image, as an image recognition result. For example, a map area 1820 of FIG. 18 may be provided as a map image recognition result associated with the input image of FIG. 4. The map area 1820 corresponding to the recognition result may include a POI 1806 corresponding to a POI recognized on the input image. The user terminal 101 that provides the input image may receive, from the map recognition system 100, map information that includes a POI recognized on the input image and may display the received map information as a recognition result of the input image.

As described above, the map recognition system 100 according to example embodiments may receive a map image, may recognize a POI on the input map image using OCR technology, and may retrieve an actual map area (latitude/longitude and a boundary) corresponding to the map image based on the recognized POI.

Figure 19:
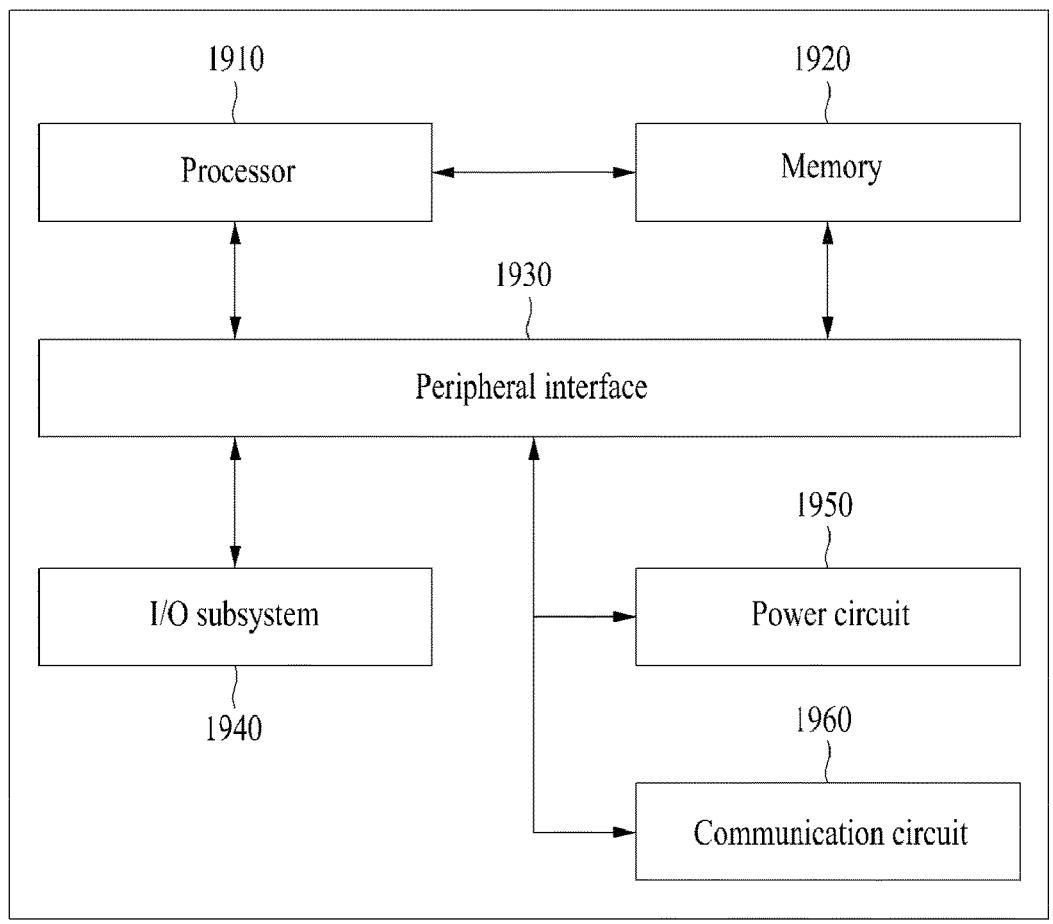
FIG. 19 is a block diagram illustrating a configuration of a computer system according to an example embodiment.

FIG. 19 is a block diagram illustrating an example of a configuration of a computer system 1900 representing the user terminal 101 according to an example embodiment. Referring to FIG. 19, the computer system 1900 includes at least one processor 1910, a memory 1920, a peripheral interface 1930, an input/output (I/O) subsystem 1940, a power circuit 1950, and a communication circuit 1960.

The memory 1920 may include, for example, a high-speed random access memory (HSRAM), a magnetic disk, a static random access memory (SRAM), a dynamic RAM (DRAM), read only memory (ROM), a flash memory, or a non-volatile memory. The memory 1920 may include a software module, an instruction set, or a variety of data required for an operation of the computer system 1900. Here, an access from another component, such as the processor 1910 and the peripheral interface 1930, to the memory 1920 may be controlled by the processor 1910.

The peripheral interface 1930 couples an input/output (I/O) subsystem 1940 of the computer system 1900 with the processor 1910 and the memory 1920. The processor 1910 may perform a variety of functions for the computer system 1900 and process data by executing the software module or the instruction set stored in the memory 1920.

The I/O subsystem 1940 may couple various I/O peripheral devices with the peripheral interface 1930. For example, the I/O subsystem 1940 may include a controller for coupling the peripheral interface 1930 and a peripheral device (not shown), such as a monitor, a keyboard, a mouse, a printer, a touch screen or a sensor depending on a necessity, etc. According to another aspect, the I/O peripheral devices may be coupled with the peripheral interface 1930 without using the I/O subsystem 1940.

The power circuit 1950 supplies power to all of or a portion of components of a terminal. For example, the power circuit 1950 may include a power management system, at least one power source such as a battery and alternating circuit (AC), a charge system, a power failure detection circuit, a power converter or inverter, a power status indicator, or other components for creating, managing, and distributing power.

The communication circuit 1960 enables communication with another computer system using at least one external port. Alternatively, as described above, the communication circuit 1960 may enable communication with another computer system by including a radio frequency (RF) circuit and thereby transmitting and receiving an RF signal known as an electromagnetic signal.

The embodiment of FIG. 19 is only an example of the computer system 1900. The computer system 1900 may have a configuration or an arrangement omitting a portion of the components illustrated in FIG. 19, further including components not illustrated in FIG. 19, or coupling two or more components. For example, a computer system for a communication terminal of a mobile environment may further include a touch screen, a sensor, and the like, in addition to the components of FIG. 19. A circuit for RF communication using a variety of communication methods, for example, wireless fidelity (Wi-Fi), 3rd generation (3G), long term evolution (LTE), Bluetooth, near field communication (NFC), ZigBee, etc., may be included in the communication circuit 1960. Components includable in the computer system 1900 may be configured as hardware that includes an integrated circuit specified for at least one signal processing or application, software, or a combination of hardware and software.

The map recognition methods according to example embodiments may be configured in a program instruction form executable through a variety of computer systems and thereby recorded in non-transitory computer-readable media.

The map recognition program according to the example embodiments may be configured as a PC-based program or an application exclusive for a mobile terminal. The map recognition app according to the example embodiments may be configured as an independently operating program app or may be configured in an in-app form of a specific application, for example, a map service program and the like to be operable on the specific application.

Also, the map recognition methods according to example embodiments may be performed in such a manner that an application associated with a map recognition system controls a user terminal. Also, the application may be installed on the user terminal through a file provided from the file distribution system. For example, the file distribution system may include a file transmitter (not shown) to transmit the file in response to a request from the user terminal.

As described above, according to some example embodiments, it is possible to recognize any type of map images, such as a paper map, a rough or sketch map, etc., as well as a precise electronic map, without being affected by a type or a form, by recognizing a POI on a map image using OCR technology and by retrieving a map area corresponding to the map image based on the recognized POI. Also, according to some example embodiments, it is possible to recognize a map image based on a POI and to accurately retrieve a map area corresponding to the map image using a database including POI information, instead of using a database about the entire topographical information of the map image.

The map recognition apparatuses described herein may be implemented using hardware components, software components, and/or combination of the hardware components and the software components. For example, the apparatuses and the components may be configured using at least one universal computer or special purpose computer, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The map recognition methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical discs and floptical disks; and hardware devices that are specially configured to store and perform program instructions, such as read-only memory (ROM), random access memory (RAM), flash memory), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While the present invention is described with reference to limited example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents Therefore, the scope of the disclosure is defined not by the detailed description, but by the claims and their equivalents, and all variations within the scope of the claims and their equivalents are to be construed as being included in the disclosure.

What is claimed is:

1. A map recognition system comprising:
    at least one processor for executing a plurality of programs that perform a plurality of predefined functions, the functions including,
    a recognizer configured to recognize a character on an input map image using a character recognition technology, the input map image having a center point and boundary;
    a searcher configured to search a database including point of interest (POI) information for a POI corresponding to the character; and
    a provider configured to provide map information including the POI as a recognition result of the input map image and causing an output screen to display an actual map image including the POI based on the provided map information;
    wherein the provider is configured to acquire a center point and a boundary of a map area corresponding to the center point and boundary of the input map image based on location information of the POI, wherein the provided map information is based on the acquired center point and boundary.

2. The map recognition system of claim 1, wherein the recognizer is configured to recognize the character on the input map image using an optical character reader (OCR).

3. The map recognition system of claim 1, wherein the recognizer is configured to extract a character candidate area from the input map image and to recognize the character by performing an OCR on the character candidate area.

4. The map recognition system of claim 3, wherein the recognizer is configured to extract the character candidate area using a corner detector that detects a corner in an image.

5. The map recognition system of claim 1, wherein the database includes a POI on a map and location information of the POI, and
    the searcher is configured to search for location information of the POI corresponding to the character.

6. The map recognition system of claim 1, wherein the provider is configured to acquire a map area corresponding to the input image by comparing a location of the character on the input map image and a location of the POI on an actual map.

7. A map recognition method executed on a computer, the method comprising:
    recognizing a character on an input map image using a character recognition technology, the input map image having a center point and boundary;
    searching a database including point of interest (POI) information for a POI corresponding to the character; and
    providing map information including the POI as a recognition result of the input map image and causing an output screen to display an actual map image including the POI based on the provided map information;

wherein the providing comprises acquiring a center point and a boundary of a map area corresponding to the center point and boundary of the input map image based on location information of the POI, wherein the provided map information is based on the acquired center point and boundary.

8. The method of claim 7, wherein the recognizing comprises recognizing the character on the input map image using an optical character reader (OCR).

9. The method of claim 7, wherein the recognizing comprises:
   extracting a character candidate area from the input map image; and
   recognizing the character by performing an OCR on the character candidate area.

10. The method of claim 7, wherein the database includes a POI on a map and location information of the POI, and
    the searching comprises searching for location information of the POI corresponding to the character.

11. A non-transitory computer-readable medium storing instructions to control a computer system to provide a map recognition function, wherein the instructions control the computer system to perform a method comprising:
   recognizing a character on an input map image using a character recognition technology, the input map image having a center point and boundary;
   searching a database including point of interest (POI) information for a POI corresponding to the character; and
   providing map information including the POI as a recognition result of the input map image and causing an output screen to display an actual map image including the POI based on the provided map information;
   wherein the providing comprises acquiring a center point and a boundary of a map area corresponding to the center point and boundary of the input image based on location information of the POI, wherein the provided map information is based on the acquired center point and boundary.

12. A file distribution system for distributing a file of an application installed on a user terminal, the file distribution system comprising:
   a processor configured to provide a file transmitter function for transmitting the file in response to a request from the user terminal,
   wherein the application comprises:
   a module configured to recognize a character on an input map image using a character recognition technology, the input map image having a center point and boundary;
   a module configured to search a database including point of interest (POI) information for a POI corresponding to the character; and
   a module configured to provide map information including the POI as a recognition result of the input map image and causing an output screen of the user terminal to display an actual map image including the POI based on the provided map information; and
   a module configured to acquire a center point and a boundary of a map area corresponding to the center point and boundary of the input map image based on location information of the POI, wherein the provided map information is based on the acquired center point and boundary.

13. A user terminal comprising:
   a memory to which at least one program is loaded;
   an output screen; and
   at least one processor,
   wherein the at least one processor is configured to perform,
   a process of transmitting an input map image to a map recognition system under control of the program, the input map image having a center point and boundary;
   a process of receiving, from the map recognition system, map information including a point of interest (POI) recognized on the input map image; and
   a process of displaying the map information on an output screen as a recognition result of the input map image, and
   wherein the map recognition system is configured to recognize a character on the input map image using a character recognition technology, to search a database including point of interest (POI) information for a POI corresponding to the character, to provide map information including the POI as a recognition result of the input map image, and to cause the output screen to display an actual map image including the POI based on the provided map information;
   wherein providing map information comprises acquiring a center point and a boundary of a map area corresponding to the center point and boundary of the input map image based on location information of the POI, wherein the provided map information is based on the acquired center point and boundary.

* * * * *